(12) United States Patent
Fujita

(10) Patent No.: US 8,477,362 B2
(45) Date of Patent: Jul. 2, 2013

(54) APPLICATION FUNCTION EXTENSION METHOD, SYSTEM, AND PROGRAM

(75) Inventor: Tadanobu Fujita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 12/718,607

(22) Filed: Mar. 5, 2010

(65) Prior Publication Data

US 2010/0245852 A1 Sep. 30, 2010

(30) Foreign Application Priority Data

Mar. 26, 2009 (JP) ................. 2009-076770

(51) Int. Cl.
*G06F 15/00* (2006.01)
*B41J 29/38* (2006.01)

(52) U.S. Cl.
USPC ........................................... 358/1.2

(58) Field of Classification Search
USPC ........................................... 358/1.2
See application file for complete search history.

(56) References Cited

U.S. PATENT DOCUMENTS

2006/0227158 A1* 10/2006 Otani et al. ................... 347/14

FOREIGN PATENT DOCUMENTS

| JP | 2001-094767 A | 4/2001 |
| JP | 2003-216366 A | 7/2003 |
| JP | 2008-293105 A | 12/2008 |

* cited by examiner

*Primary Examiner* — Saeid Ebrahimi Dehkordy
(74) *Attorney, Agent, or Firm* — Canon USA Inc IP Division

(57) ABSTRACT

According to an embodiment of the present invention, in a plug-in of a general use application, sheet size information and margin information set by the application are calculated by using a scaling factor at the time of an expansion or reduction printing. The calculated sheet size information and margin information are reconfigured into the application.

5 Claims, 11 Drawing Sheets

APPLICATION FUNCTION EXTENSION METHOD, SYSTEM, AND PROGRAM

BACKGROUND OF THE INVENTION

1. Field of the Invention

The present invention relates to a method, a system, and a program for extending a function of an application.

2. Description of the Related Art

When image data on which editing, display, or the like is performed by an application is printed through a printer, in general, the printing is performed via a printer drive corresponding to the printer.

As a function of the printer drive in a related art, an expansion reduction function is proposed for expanding or reducing an original sheet size set on the application on the printer drive to an output sheet size to be actually printed. This expansion reduction function is carried out by calculating a scaling factor for expanding or reducing the image data of the application while a ratio of a valid printing area between the original sheet size and the output sheet size is used as a reference.

Up to now, in a case where the image data in the original sheet size is small, if the output sheet size is set larger than the original sheet size, the original sheet size is expanded to the output sheet size by the above-described expansion reduction function of the driver. At that time, a margin area of the image data is similarly expanded. For that reason, the margin area is larger than a margin area set by a user on the original sheet size, and the user may sense that the printed image data becomes rather small in some cases. For example, in FIG. 11, a margin of the valid printing area (an inner side of a broken line part) is also proportionately increased at the time of the expansion. For this reason, when the user actually performs the sheet output, the user senses that the image data (marked out part) can be further expanded to some extent.

Such a problem becomes obvious when, in particular, by using a large-sized printer, the image data created on the application is printed on a sheet of a large size such as a longitudinal printing or a banner printing. This is because the image data created on a sheet of the A4 size on the application is expanded to the sheet of the large size such as the longitudinal printing or the banner printing, even when the expansion ratio of the margin is the same as the image data, the margin part becomes conspicuous.

For that reason, the image data from the application is to be printed, the image data is once accumulated in the printer driver, and the image data accumulated to be in the valid printing area (maximum printing area) of the output sheet size is printed while being expanded or reduced. According to this, Japanese Patent Laid-Open No. 2001-094767 discloses a printing technology for expanding only the image data to the valid printing area to minimize the margin.

Meanwhile, a large number of applications publishing a unit for extending its own function exist. For example, applications such as Microsoft Office (Microsoft Corporation of USA) and Microsoft Internet Explorer (Microsoft Corporation of USA) are exemplified. These applications can provide an additional function to the user by registering an additional program in conformity to the published unit. Then, such an additional program for providing the additional function to the application is generally called plug-in.

Japanese Patent Laid-Open No. 2003-216366 discloses a function extension of an application utilizing the plug-in.

However, a technology disclosed in Japanese Patent Laid-Open No. 2001-094767 has the following problem.

In a case where the image data is created by the application, in general, a margin setting is performed on the application, but in a case where only the image data is expanded to the valid printing area as in Japanese Patent Laid-Open No. 2001-094767, the margin set on the application becomes invalid. That is, the printing result becomes entirely different as the margin set on the application by the user is not reflected on a printing result.

Furthermore, the printer driver cannot obtain the margin information set on the application. For that reason, when the printing is performed while using the expansion reduction function of the driver, in order to reflect the margin set by the user on the output result, it is necessary to set the margin while taking into account a scaling factor in the printer driver on the application. For that reason, the user needs to perform such a complex processing that before data is sent to the printer driver from the application (before a printing instruction is issued), a scaling factor for the expansion or reduction from the original sheet size set on the application to the output side is previously calculated, and from the calculation result, the margin amount on the application is changed to an appropriate value.

In particular, in a case where the expansion printing is performed by using the large-sized printer, the scaling factor by the printer driver becomes large, and it is extremely difficult to demand the user to perform both the scaling factor calculation and the resetting of the margin amount.

SUMMARY OF THE INVENTION

In view of the above-described problems, the present invention has been made and provides the following configuration.

There is provided a method to be performed in a system which includes a computer having a program installed therein for extending a function of an application also installed into the computer, wherein the computer is configured to be connected to a printing apparatus. The method includes, via a specification unit, specifying an output sheet size output by the printing apparatus; via an obtaining unit, obtaining a sheet size and margin information set on the application; via a drawing area calculation unit, calculating a drawing area of the application from obtained the sheet size and the obtained margin information; via a scaling factor calculation unit, calculating a scaling factor for changing the sheet size from the specified output sheet size and the obtained sheet size to the output sheet size; via a margin information calculation unit, calculating margin information in the output sheet size on the basis of the calculated scaling factor and the margin information; and via an update unit, updating the sheet size and the margin information of the application by the sheet size created on the basis of the calculated drawing area and the margin information calculated in the calculating the margin information.

According to the embodiment of the present invention, when the printing is performed with the expansion or reduction on the printer driver from the original sheet size set by the application to the output sheet size for the actual printing, it is possible to perform the printing with the margin amount which takes into account the margin information set by the user on the application.

Further features of the present invention will become apparent from the following description of exemplary embodiments with reference to the attached drawings.

BRIEF DESCRIPTION OF THE DRAWINGS

FIG. 9 shows a margin setting screen for setting a margin of an output sheet size from a plug-in.

DESCRIPTION OF THE EMBODIMENTS

Hereinafter, as an example of preferable embodiments of the present invention, a plug-in software of a spreadsheet software (hereinafter, which will be referred to as plug-in) is exemplified. On the basis of an operation of the plug-in, a description will be provided of a realization method for an expansion printing while taking into account a margin set by the spreadsheet software.

Herein, the plug-in refers to a program for adding a function to an application installed into a computer.

For example, Microsoft Office (Microsoft Corporation of USA) and the like publish a unit for extending its own function. For that reason, these applications can add the function by registering the plug-in.

Figure 1:
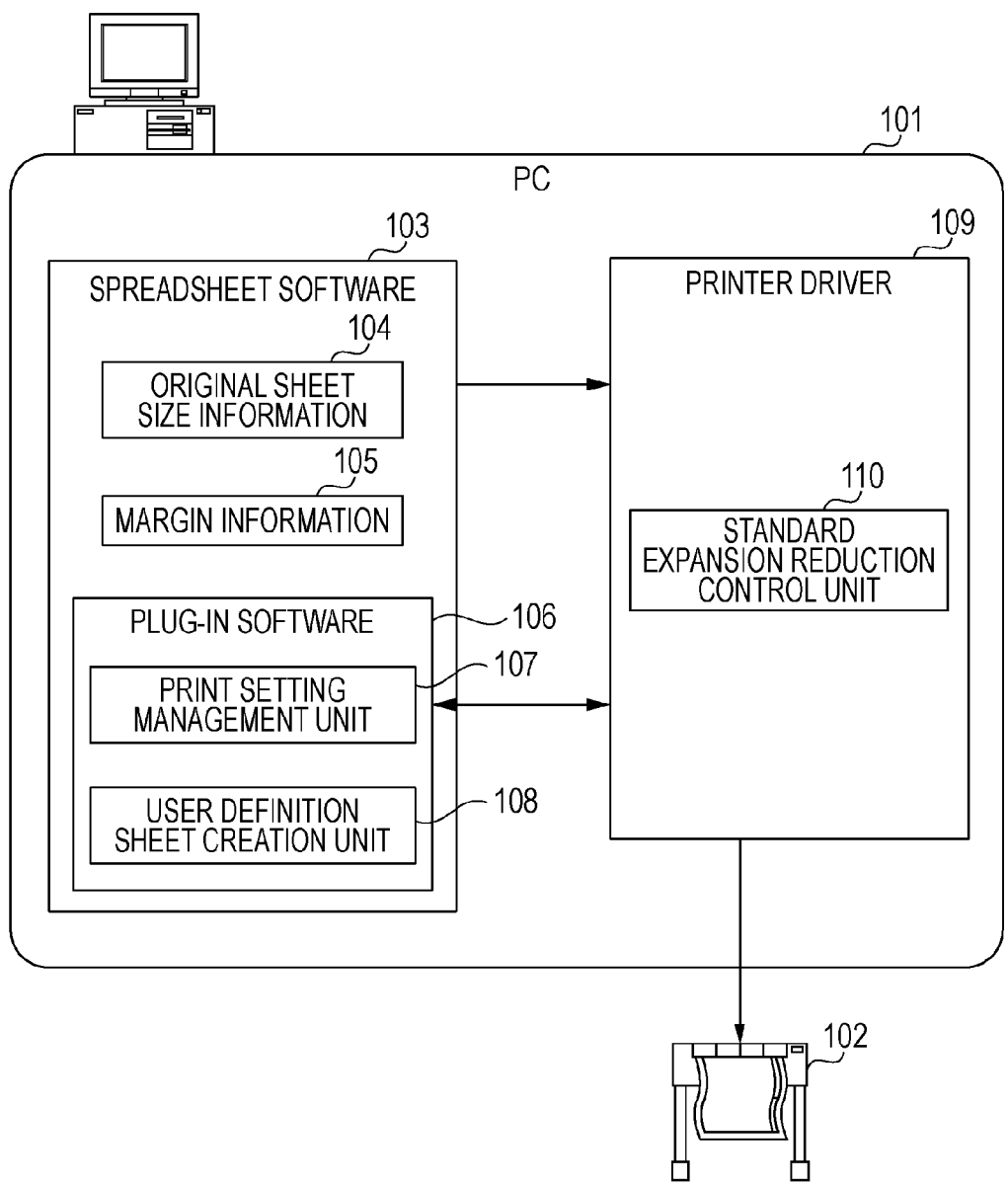
FIG. 1 is a block diagram of a schematic configuration according to an embodiment of the present invention.

FIG. 1 shows a system configuration of a system into which a plug-in according to an embodiment of the present invention is installed. The system is composed of a PC 101 and a printer 102 represented by a large-sized printer. A spreadsheet software 103 operating on the PC 101 according to the present embodiment is a general spreadsheet software, which will be described while assuming Microsoft Excel (Microsoft Corporation of USA).

In the spreadsheet software 103, original sheet size information 104 set in the spreadsheet software and a holding unit for margin information 105 set in the spreadsheet software are incorporated. A plug-in software 106 functioning as an extension unit for extending a function of the spreadsheet software (hereinafter, which will be referred to as plug-in) is operated on the spreadsheet software and operated in collaboration with a printer driver for controlling the spreadsheet software or a printer. A print setting management unit 107 provided to the plug-in 106 has a print setting program which will be described below. A user definition sheet creation unit 108 provided to the plug-in 106 creates a user definition sheet size in which the margin information set in the application is maintained as much as possible at the time of expansion and reduction.

In the printer driver 109, the spreadsheet software 103 requests a printer via an operating system (hereinafter, which will be referred to as OS) to perform printing. To be more specific, the printing command received from the application via the OS is interpreted, and print data which can be interpreted by the printer is generated. Also, a change in the printing setting from the plug-in 106 is accepted. Furthermore, the printer driver 109 includes a standard expansion reduction control unit 110 for calculating the size of the user definition sheet after the margin calculation from the original sheet size of the application and performing expansion and reduction to an output sheet size to be actually printed.

Figure 2:
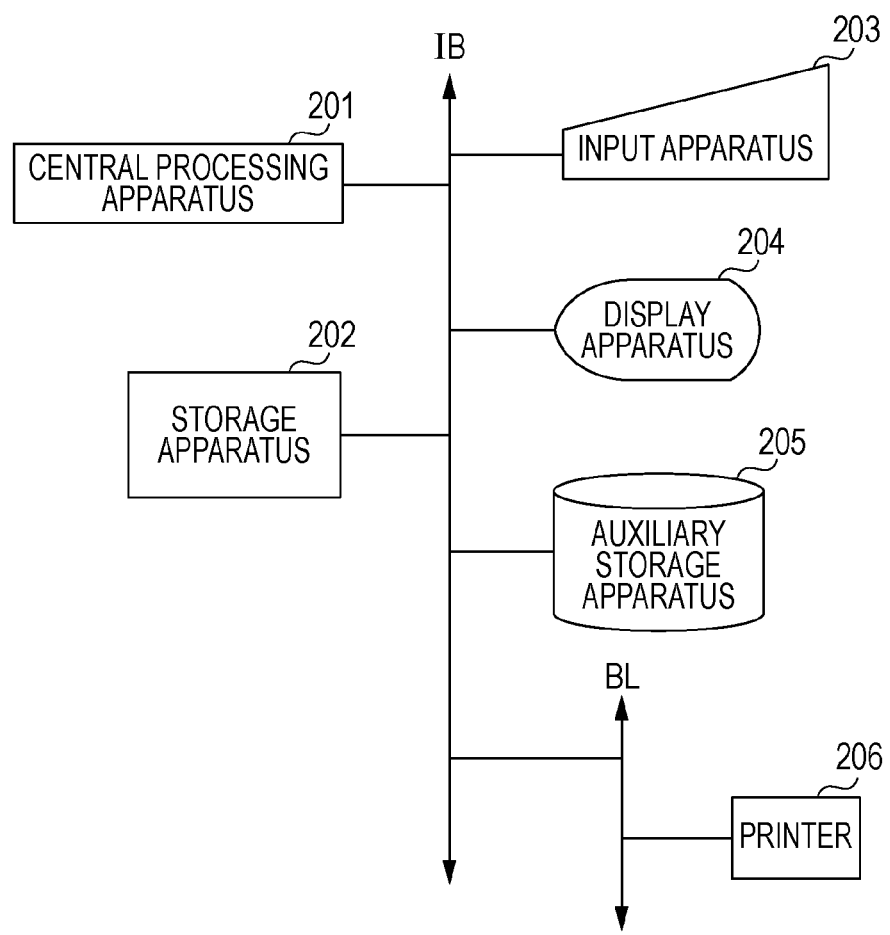
FIG. 2 shows a connection between an internal structure of a PC having a plug-in and an external environment.

FIG. 2 is a block diagram showing a connection between an internal structure of the PC and an external environment. This PC has a general configuration composed of a central processing apparatus 201 including a CPU, a storage apparatus 202 such as a RAM, an input apparatus 203 such as a mouse or a key board, a display apparatus 204 such as a CRT or an LCD, and an auxiliary storage apparatus 205 such as a hard disk drive or an optical magnetic disk, each of which is connected by an internal bus line IB. The input apparatus 203 is configured to carry out various inputs from the user with respect to an icon, a menu, and other objects displayed by the spreadsheet software 103 and the plug-in 106 on the display apparatus.

The auxiliary storage apparatus 205 stores the plug-in 106, the spreadsheet software 103, the OS, and other program information, which are appropriately called from the central processing apparatus 201 to be stored in the storage apparatus 202. Also, the internal bus line IB of the PC 101 is connected by the printer 102 and an external bus line BL, and a registration of a print job can be carried out from the PC with respect to the printer 102.

Figure 3:
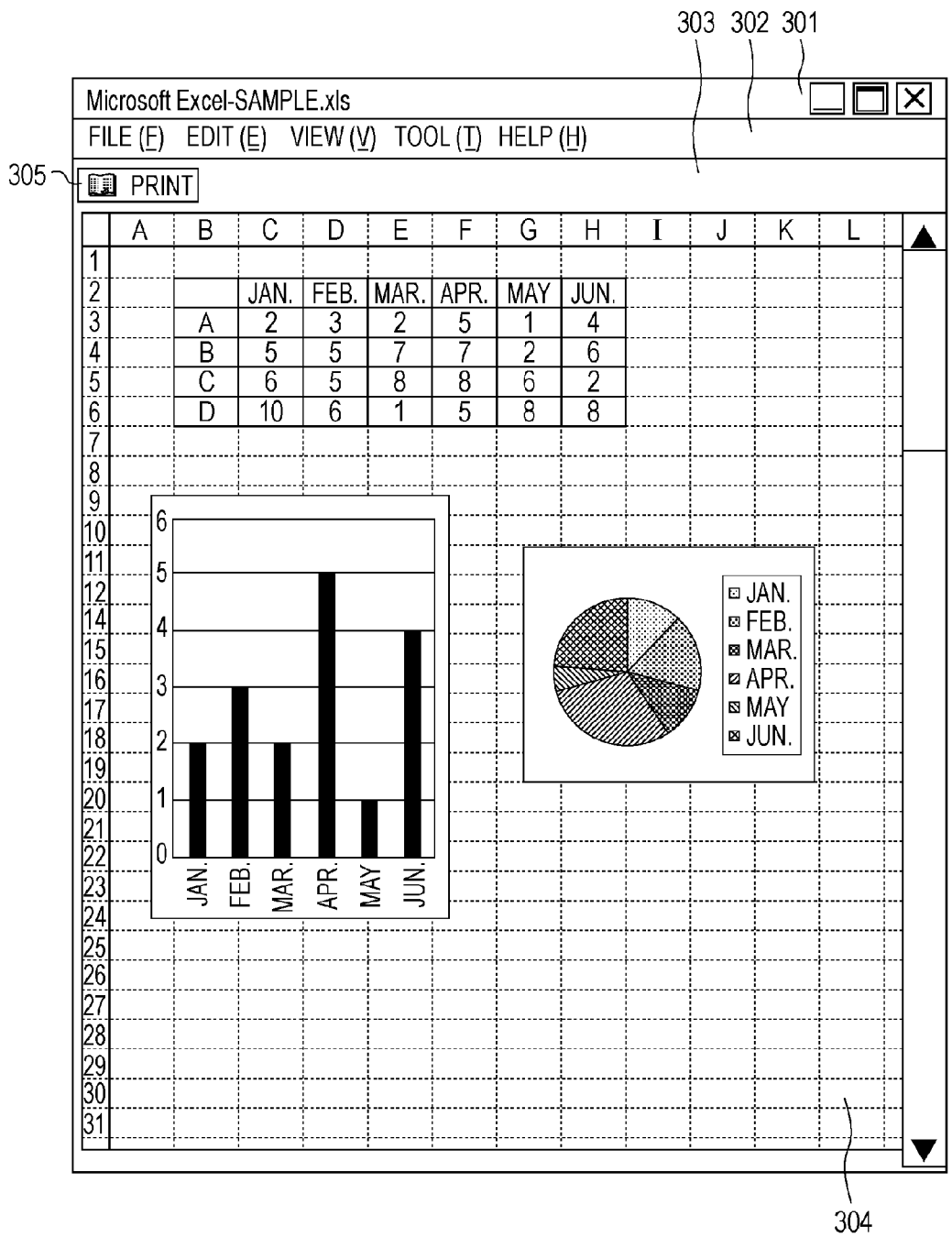
FIG. 3 shows a screen on which a spreadsheet software is activated.

Hereinafter, the plug-in according to the embodiment of the present invention will be described along an operation of the plug-in 106 which is system-registered in the spreadsheet software. FIG. 3 illustrates a screen on which the spreadsheet software 103 is activated. A screen of the spreadsheet software is composed of a title bar 301 for displaying a title or the like of a currently edited document, a menu bar 302 for displaying functions provided to the spreadsheet software in a menu format, a tool bar 303 arranged while the function provided to the plug-in or the spreadsheet software is controlled into an icon or the like, and a document display area 304 for displaying a currently edited spreadsheet document.

A plug-in printing icon 305 is displayed on the tool bar 303 of the spreadsheet software while the plug-in 106 is system-registered in the spreadsheet software. Herein, the plug-in is already registered in the spreadsheet software. A method for the system registration of the plug-in with respect to the spreadsheet software is recognized, and a description thereof will be omitted.

Figure 4A:
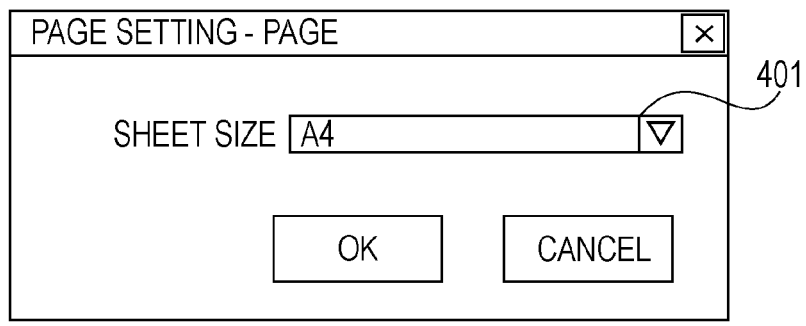
FIG. 4A shows a page setting screen for setting a sheet size from the spreadsheet software.

FIG. 4A shows a page setting screen for setting a sheet size from the spreadsheet software 103. A sheet size combo box 401 is a control for specifying the sheet size of the document created on the spreadsheet software 103. The set sheet size is put in the original sheet size information 104.

Also, the print setting management unit 107 of the plug-in 106 obtains the original sheet size which can be changed to the user definition sheet size created by the user definition sheet creation unit 108.

Figure 4B:
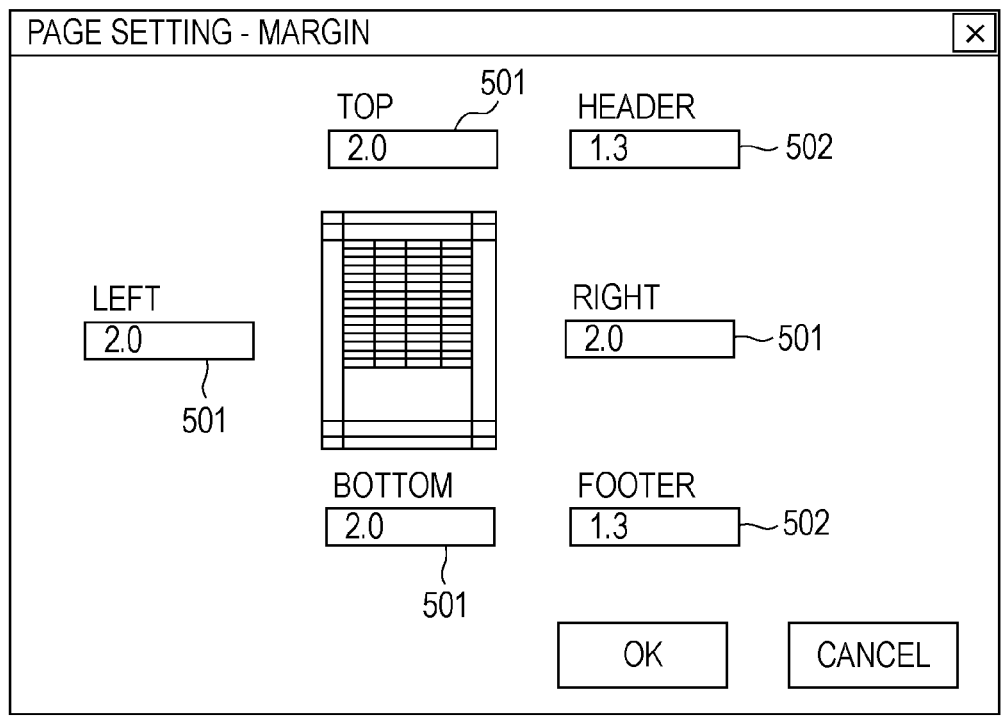
FIG. 4B shows a page setting screen for setting a margin of a page from the spreadsheet software.

FIG. 4B shows a page setting screen for setting margin information of the page from the spreadsheet software 103. Denoted by reference numeral 501 is a margin specification control for specifying a margin at the top, bottom, left, and right of the original sheet size in centimeters. Denoted by reference numeral 502 is a header footer position specification control for specifying positions of the header and the footer in centimeters. The set margin is put in the margin information 105. Also, the print setting management unit 107 of the plug-in 106 obtains the margin information 105, and update can be carried out on the basis of the changed margin information.

Figure 5A:
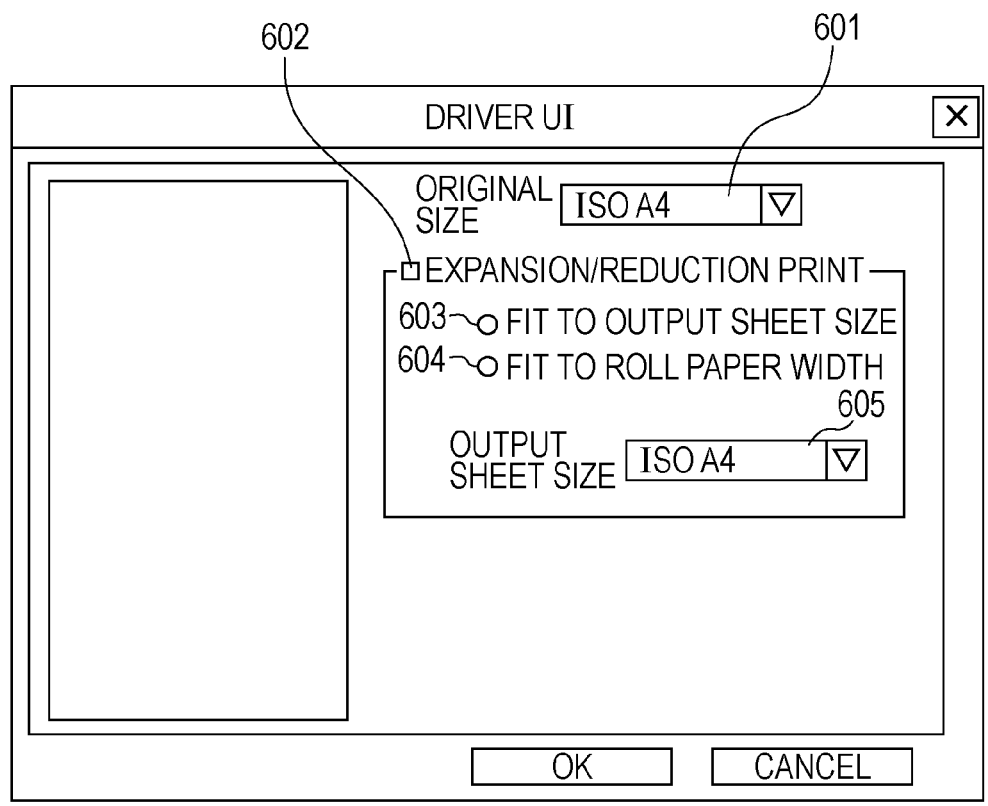
FIG. 5A illustrates a screen where a setting is performed by a standard expansion reduction control unit.

FIG. 5A illustrates a screen for performing a setting by the standard expansion reduction control unit 110 of the printer driver 109. An original size combo box 601 is a control for specifying the original sheet size created by the spreadsheet software 103. Denoted by reference numeral 602 is a tool expansion/reduction check box. In a case where a check is inserted in the tool expansion/reduction check box 602, it is possible to select one of various settings which will be described below.

Radio buttons 603 and 604 are provided for selecting a standard expansion reduction setting and one setting of which can be selected. An output sheet size combo box 605 performs a control for specifying a size of the page output by the printer 102.

The radio button 603 is set for the fitting to the output sheet size. In the printer driver 109, the radio button 603 for the fitting to the output sheet size is selected, and the printer driver 109 performs the standard expansion reduction processing from the size specified in the original size combo box 601 to the size specified in the output sheet size combo box 605.

The radio button 604 is set for the fitting to the width of the roll paper. In the printer driver 109, at the time of the selection of the radio button 604 to be fitted to the width of the roll paper, the printer driver 109 activates a specification dialog 701 for the roll paper width shown in FIG. 5B. Then, the standard expansion reduction processing is performed by automatically creating the output sheet size so as to change the width from the width of the original size 601 to the width specified in a roll paper width combo box 702.

Figure 5B:
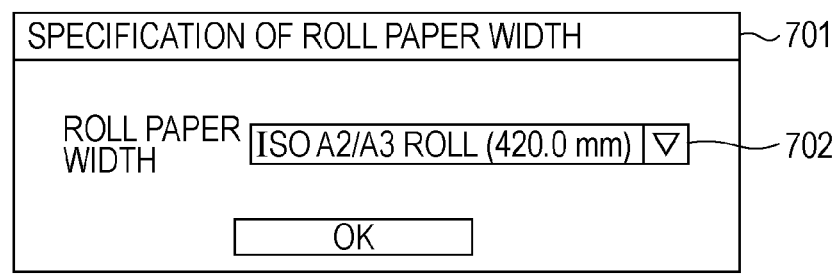
FIG. 5B shows a specification dialog for a roll width.

FIG. 5B also shows the specification dialog 701 at the roll paper width which is displayed when the user presses the plug-in printing icon 306 according to the embodiment of the present invention.

Figure 6:
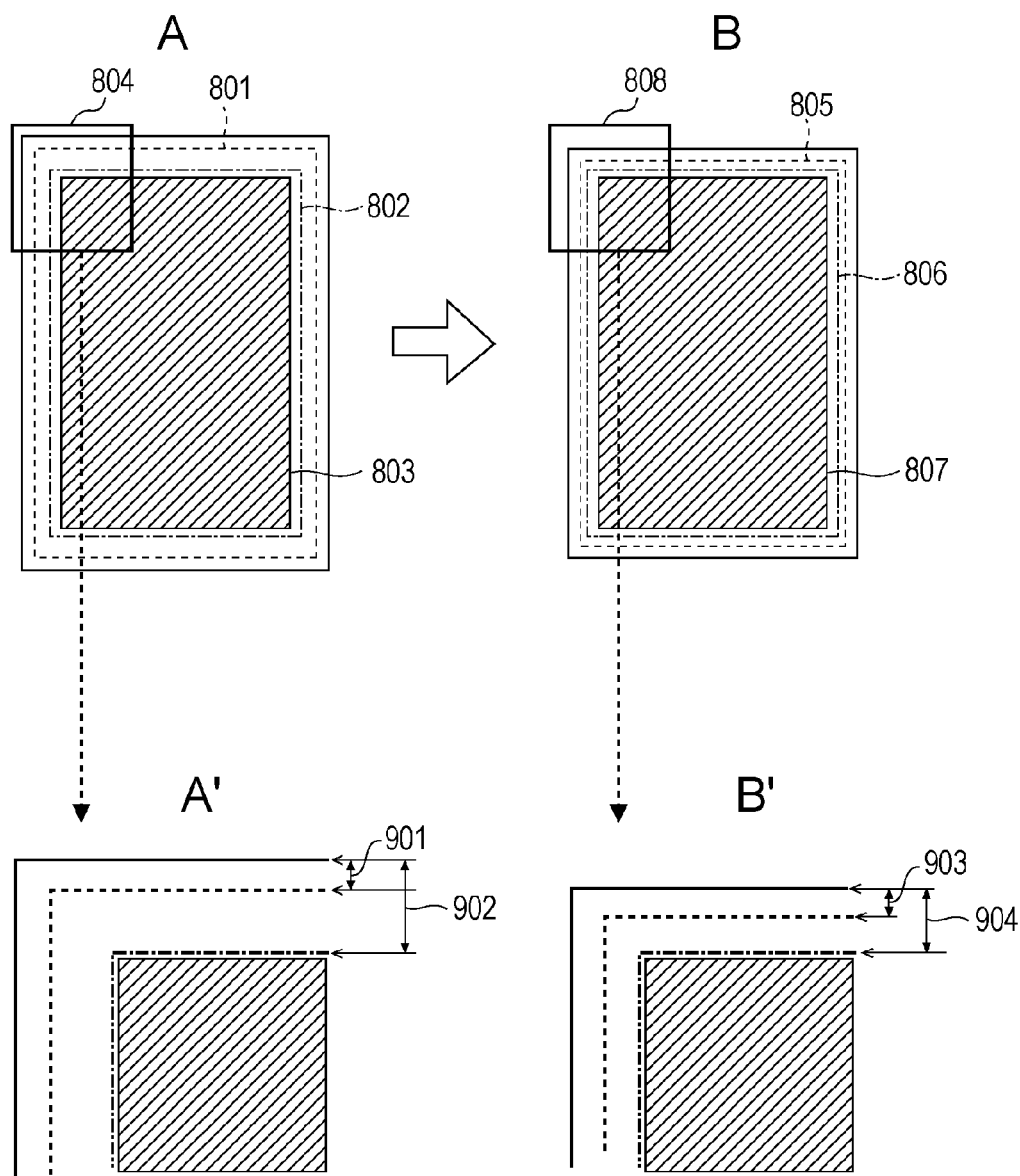
FIG. 6 shows an original sheet and a user definition sheet.

FIG. 6 shows the original sheet and the user definition sheet. A in FIG. 6 shows the original sheet set by the spreadsheet software 103. Also, the original sheet is the A4 sheet as shown in FIGS. 4A and 4B.

Reference numeral 801 denotes a valid printing area of the original sheet. According to the present embodiment, the description will be provided while the physical margin of the printer is set as 5 mm at the left, right, top, and bottom. For this reason, the valid printing area 801 has 200 mm wide, 287 mm long where the physical margin is removed from the outline sheet size of 210 mm wide, 297 mm long.

Denoted by reference numeral 802 is a drawing area of the spreadsheet software 103 in the original sheet. According to the present embodiment, the description will be provided while the margin of the spreadsheet software 103 includes the physical margin of the printer, and which is set as 20 mm at the left, right, top, and bottom as shown in FIG. 4B. For this reason, the drawing area 802 has 170 mm wide, 257 mm long where the outline sheet size of 210 mm wide, 297 mm long is removed from the margin of the spreadsheet software 103.

Reference numeral 803 denotes image data of the spreadsheet software 103 in the original sheet. Reference numeral 804 shows a part of the original sheet, and an expansion part of 804 is shown in A' in FIG. 6. A' in FIG. 6 is the expansion part located at 804 of A in FIG. 6. Reference numeral 901 denotes a physical margin 5 mm of the printer. Denoted by reference numeral 902 is a margin 20 mm of the spreadsheet software 103. Also, as described above, the margin of the spreadsheet software 103 includes the physical margin of the printer.

B in FIG. 6 shows the user definition sheet created by the user definition sheet creation unit 108 by using the method of the present embodiment. Reference numeral 805 denotes a valid printing area of the user definition sheet. Denoted by reference numeral 806 is a drawing area after the margin change of the spreadsheet software. Also, the drawing area 806 is the same as the drawing area 802 in the A4 sheet so that the image data of the spreadsheet software 103 is not rearranged. The changing processing for the margin will be described below.

Reference numeral 807 denotes drawing data of the spreadsheet software 103. Reference numeral 808 denotes a part of the user definition sheet, and an expansion part of 808 is shown in B' in FIG. 6. B' in FIG. 6 is the expansion part of 808 located in B in FIG. 6. Denoted by reference numeral 903 is a physical margin 5 mm of the printer.

Hereinafter, a calculation method for a margin 904 to be changed of the spreadsheet software 103 and a calculation method for the user definition sheet will be described. According to the present embodiment, the description will be provided of a case where the data created on the spreadsheet software 103 is expanded and printed while being fitted to the width of the roll paper represented by 604 of FIG. 5A.

The roll paper width size to be expanded is the A2 roll paper width shown in FIG. 5B. In a case where the expansion is carried out to be fitted to the roll paper width, due to the ratio between the lateral size 210 mm for the original sheet A4 and the roll paper width size 420 mm, the scaling factor is ×2.

In a case where the original sheet is the A4 sheet and the scaling factor is ×2, according to the method in the related art, the margin 15 mm of the spreadsheet software 103 except for the physical margin 5 mm (=20 mm−5 mm) is expanded at ×2. For that reason, the margin becomes 35 mm as the physical margin is added to 15 mm×2.

According to the present embodiment, the margin at the time of the expansion is set close to the value of the margin before the expansion. For that reason, a value 7.5 mm (15 mm/2) is calculated by dividing the margin to be expanded by the scaling factor, the physical margin is added, and 12.5 mm is calculated which is the margin 904 to be changed in the spreadsheet software 103 (=7.5 mm+5 mm). Also, as the drawing area 802 of the spreadsheet software 103 is not changed, the user definition sheet size to be created is 195 mm crosswise, 282 mm lengthwise while the calculated margin 12.5 mm at the left, right, top, and bottom is added to the drawing area 802. As the created user definition sheet is expanded to the roll paper width, the scaling factor is about ×2.15 (=420 mm/195 mm), and the margin becomes 21.1 mm as the physical margin is added to 7.5 mm×2.15.

In this manner, as compared with the case of the related art, the margin can be reduced by 13.9 mm, and it is possible to set the margin at the numeric value close to 20 mm which has been originally set on the application.

Herein, the horizontal to vertical ratio of the A4 sheet (the horizontal to vertical ratio of the A4 sheet (297 mm/210 mm=1.414) and the horizontal to vertical ratio of the user definition sheet (282 mm/195 mm=1.446) are different from each other, and therefore the expansion is carried out at the roll paper width on the basis of the above-described user definition sheet, the size of the printed product is changed.

However, it is also possible to perform the adjustment so as not to change the horizontal to vertical ratio in the following manner. For example, in a case where the original sheet size of A4 is expanded to the output sheet size of A2, if the horizontal to vertical ratio is changed, a defect occurs. For this reason, the calculated size of the user definition sheet is converted at the horizontal to vertical ratio of the original sheet size.

While the drawing area 802 except for the margin is kept as it is, the margin value is expanded or reduced, so that the conversion is made into the size which has the same as the horizontal to vertical ratio of the original sheet size. It suffices that the user definition sheet size is adjusted in this manner.

Figure 7:
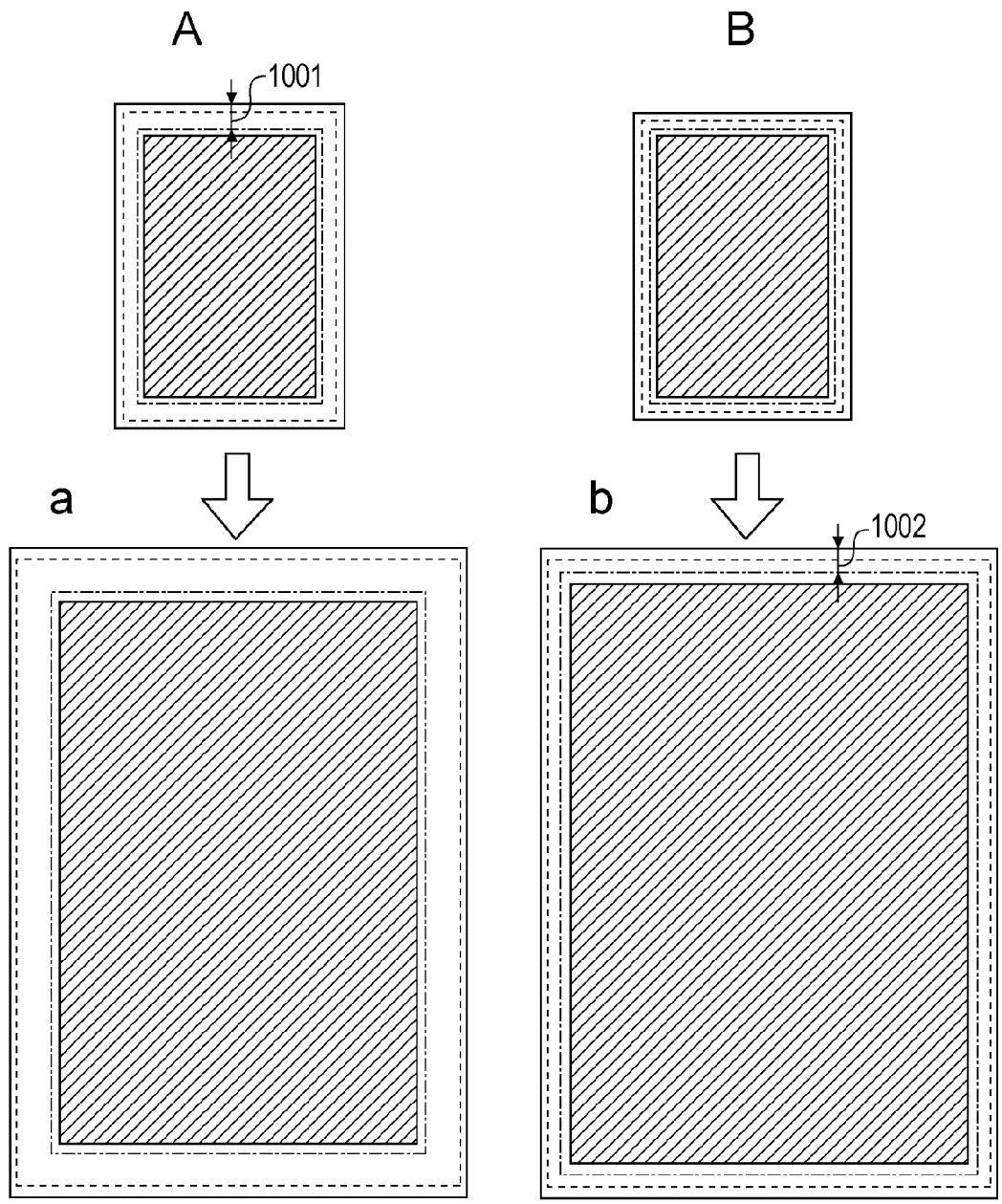
FIG. 7 shows an output result in which the original sheet and the user definition sheet are expanded to an A2 roll paper width.

FIG. 7 illustrates a difference between a case where the embodiment of the present invention is not applied and a case where the embodiment of the present invention is applied while being simplified. A of FIG. 7 shows the original sheet set in the spreadsheet software 103. Shown by a of FIG. 7 is an output result in a case where the original sheet is expanded to the A2 roll paper width size. B of FIG. 7 shows the user definition sheet created by the user definition sheet creation unit 108. Shown by b in FIG. 7 is an output result in a case where the user definition sheet is expanded to the A2 roll paper width size.

With respect to the spreadsheet software 103, as the drawing area of the spreadsheet software is not changed, a smaller margin is set, and at the same time, the user definition sheet created from the margin is newly set. In a case where the expansion to the roll paper width is performed, an operation is carried out so as to obtain the margin which takes into account a margin 1001 of the spreadsheet software 103 set in the original sheet and a margin part 1002 of the spreadsheet software 103 expanded from the user definition sheet to the A2 roll paper width.

Figure 8:
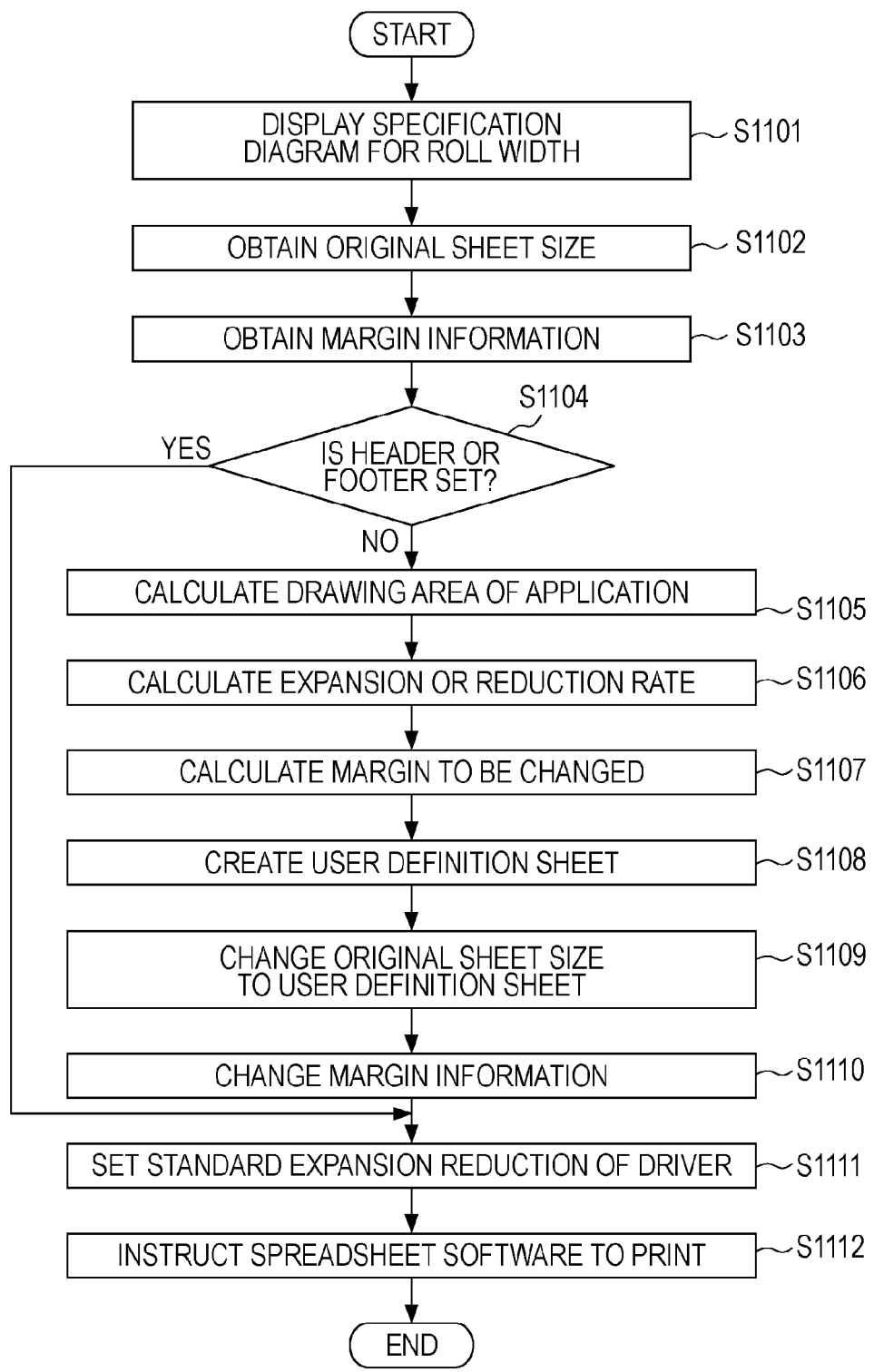
FIG. 8 is a flow chart for describing Embodiment 1.

Hereinafter, a detailed operation of the plug-in according to the embodiment of the present invention will be described along a flow chart. FIG. 8 is a flow chart for a plug-in program representing a series of operations in the plug-in according to the embodiment of the present invention.

First, when the plug-in activation icon 305 is pressed by the user on the tool bar 303 of the spreadsheet software 103, the operation of the plug-in program is started, and the flow is shifted to step S1101. In step S1101, the above-described display of the specification dialog 701 at the roll paper width is performed, and an input stand-by state from the user occurs.

The user specifies the roll paper width on the specification dialog 701 at the roll paper width. Herein, an A2 roll (594 mm) is specified. An OK button is pressed, and the flow is shifted to step S1102.

In step S1102, the print setting management unit 107 obtains the original sheet size information 104 of the spreadsheet software 103. Herein, a sheet size of the A4 sheet is obtained, and the flow is shifted to step S1103.

In step S1103, the print setting management unit 107 obtains the margin information 105 of the spreadsheet software 103. Herein, margin information of 2 cm at the top, bottom, left, and right is obtained. Also, setting information on the header or the footer is obtained, and the flow is shifted to step S1104.

In step S1104, a setting state is determined whether the header or the footer is set. In a case where the setting is made, as a part or all of the header or footer information may be lost, the setting of the corresponding margin is not changed, the flow is shifted to step S1111.

In a case where the setting is not made, the flow is shifted to step S1105. In step S1105, from the original sheet size information 104 and the margin information 105 obtained in step S1102, the drawing area of the spreadsheet software 103 is calculated.

As described with regard to B' in FIG. 6, the drawing area 802 has 170 mm wide, 257 mm long where the margin of the spreadsheet software 103 is removed from the outline sheet size of the A4 sheet of 210 mm wide, 297 mm long. Then, the flow is shifted to step S1106.

In step S1106, from the obtained roll paper width and the original sheet size, the expansion or reduction rate is calculated. With respect to the A2 roll paper width (594 mm), as the width of the original sheet size (the A4 sheet) is 297 mm, ×2 is calculated as the scaling factor, and the flow is shifted to step S1107. In step S1107, the margin information 105 of the spreadsheet software 103 is calculated from the expansion or reduction rate calculated in step S1106.

As described with regard to B' in FIG. 6, a value 7.5 mm (15 mm/2) is calculated by dividing the margin 15 mm of the spreadsheet software 103 except for the physical margin 5 mm (=20 mm−5 mm) by the scaling factor, which is then added with the physical margin to calculate 12.5 mm, and the flow is shifted to step S1108.

In step S1108, from the drawing area of the spreadsheet software calculated in step S1105 and the margin calculated in step S1106, the user definition sheet creation unit 108 creates the user definition sheet. As described with regard to B' in FIG. 6, the calculated margin 12.5 mm is added to the drawing area 802 of the spreadsheet software of 170 mm wide, 257 mm long at the top, bottom, left, and right to result in 195 mm crosswise, 282 mm lengthwise. Then, the flow is shifted to step S1109.

In step S1109, the print setting management unit 107 changes the original sheet size information 104 of the calculation software 103 to the user definition sheet created in step S1108, and the flow is shifted to step S1110. In step S1110, the print setting management unit 107 updates the margin information 105 of the calculation software 103 to the margin information calculated in step S1107, and the flow is shifted to step S1111.

In step S1111, the print setting management unit 107 performs the standard expansion reduction setting with the radio button 604 from the size of the user definition sheet with respect to the printer driver 109 to be fitted to the width of the roll paper, and the flow is shifted to step S1112. In step S1112, the plug-in program instructs the spreadsheet software to perform the printing at the current setting and ends the flow.

As described above, the plug-in uses the scaling factor on the printer driver to update the set value of the margin on the spreadsheet software and thereafter instructs the printer driver to send a print command.

The expansion processing is performed in response to the print command from the spreadsheet software on the printer driver, and the print product illustrated in b in FIG. 7 can be obtained. According to the present embodiment, the case is described in which the margin setting values at the top, bottom, left, and right are the same, but if the margin setting values are different from one another, the margin setting values respectively corresponding to the top, bottom, left, and right are calculate to obtain the size of the user definition sheet, it is possible to obtain the output result on which the respective margins are reflected.

As an example of preferable embodiments of the present invention, similarly as in Embodiment 1, a plug-in of the spreadsheet software is exemplified. A method of performing an expansion printing by setting a margin exceeding a set range of the spreadsheet software on the basis of an operation of the plug-in will be described. A sheet size and a value of a margin set from the spreadsheet software 103 according to the present Embodiment 2 are the same as those in FIGS. 4A and 4B according to Embodiment 1.

In an application having a limitation on the sheet size that can be dealt with (for example, the sheet size up to 55 cm lengthwise and crosswise in Microsoft Word (trademark of Microsoft Corporation of USA)), in a case where the long object printing is carried out, a limitation is caused on the margin which can be set by the application.

For example, in the large-sized printer, in a case where printing is carried out at the output sheet size of 60 inches wide (152.4 cm), 550 cm long, the original sheet size to be created by Microsoft Word is 6 inches wide (15.24 cm), 55 cm long. As the width is 6 inches, the margin on the left and right which can be set by the application is about 7.6 cm at maximum. This is because the margin setting of the application cannot exceed the sheet size.

For that reason, in a case where the left and right margins are set as the same at the width of 6 inches (15.24 cm), the setting exceeding 7.6 cm=15.24 cm/2 cannot be made.

Furthermore, in order to improve the image quality level, a smaller scaling factor is more preferable. For that reason, in a case where the expansion is carried out to 550 cm, it is desirable to carry out the expansion at ×10 while setting the maximum length 55 cm of the Word (for example, in a case where Word is created at 11 cm, ×50 expansion is carried out, and the quality level is degraded). For that reason, in a case where the maximum length of Word is set as 55 cm, ×10 expansion is carried out 10, and the width set on Word is 6 inches (15.24 cm)=60 inches/10.

In this manner, in particular, in the case of the large-sized printing, the printing is carried out on the sheet where the output sheet size is equal to or larger than the sheet size which can be set by the application, it is desired that the margin can be set to be equal to or larger than the margin amount which can be set by the application.

In addition, also in an application having no limitation on the size that can be dealt with (for example, Microsoft Excel (Microsoft Corporation of USA), in a case where the original sheet size is small, similarly as in the above description, a limitation is caused on the margin which can be set by the application. According to the present embodiment, by creating a system in which the margin after the expansion can be set in the plug-in while taking Microsoft Excel as an example, without changing the original part other than the margin, it is aimed at that the margin can be freely set.

That is, a function is provided so that the margin can be set to be equal to or larger than the margin amount by the application on the plug-in without dealing with the original other than the margin even when the user does not pay attention to the scaling factor.

To be more specific, a case will be described in which the original sheet size to be created is set at 6 inches wide, 55 cm long, and the roll width expansion of 60 inches is performed in the plug-in. In particular, a case will be described as an example in which a setting of a margin exceeding 7.6 cm which cannot be actually set on the application with respect to the sheet size to be actually printed is performed.

Figure 9:
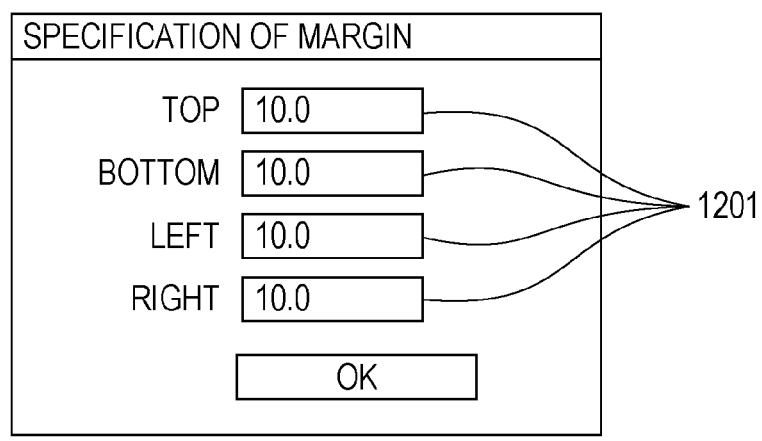

FIG. 9 shows a margin information setting screen for setting the margin of the output sheet size from the plug-in. Reference numeral 1201 denotes a margin specification control for specifying the margin at the top, bottom, left, and right of the output sheet size to be actually printed in centimeters. Herein, the margin at the top, bottom, left, and right is set as 10 cm.

Hereinafter, the margin set in the plug-in is described as plug-in margin.

Figure 10:
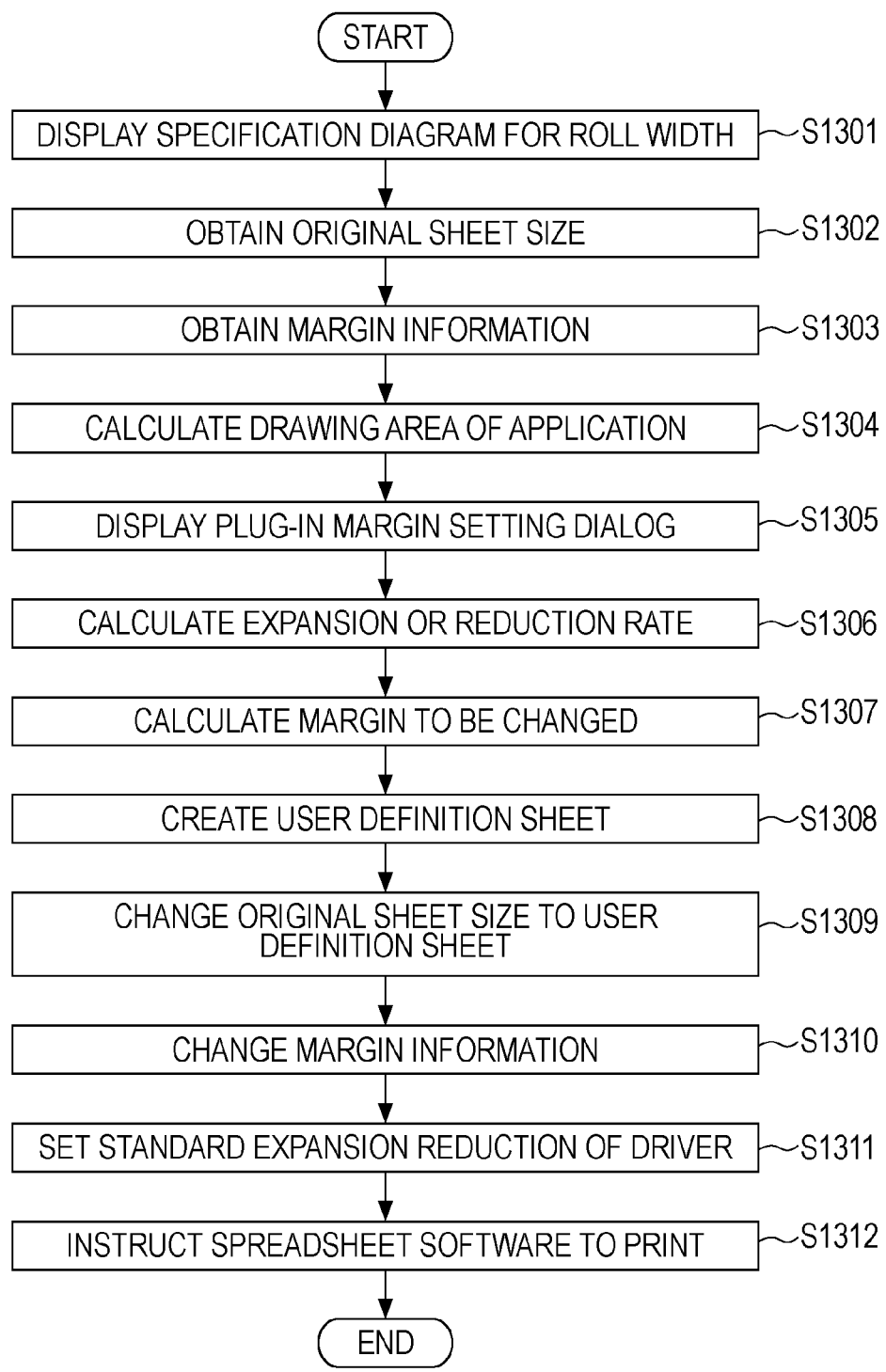
FIG. 10 is a flow chart for describing Embodiment 2.
Figure 11:
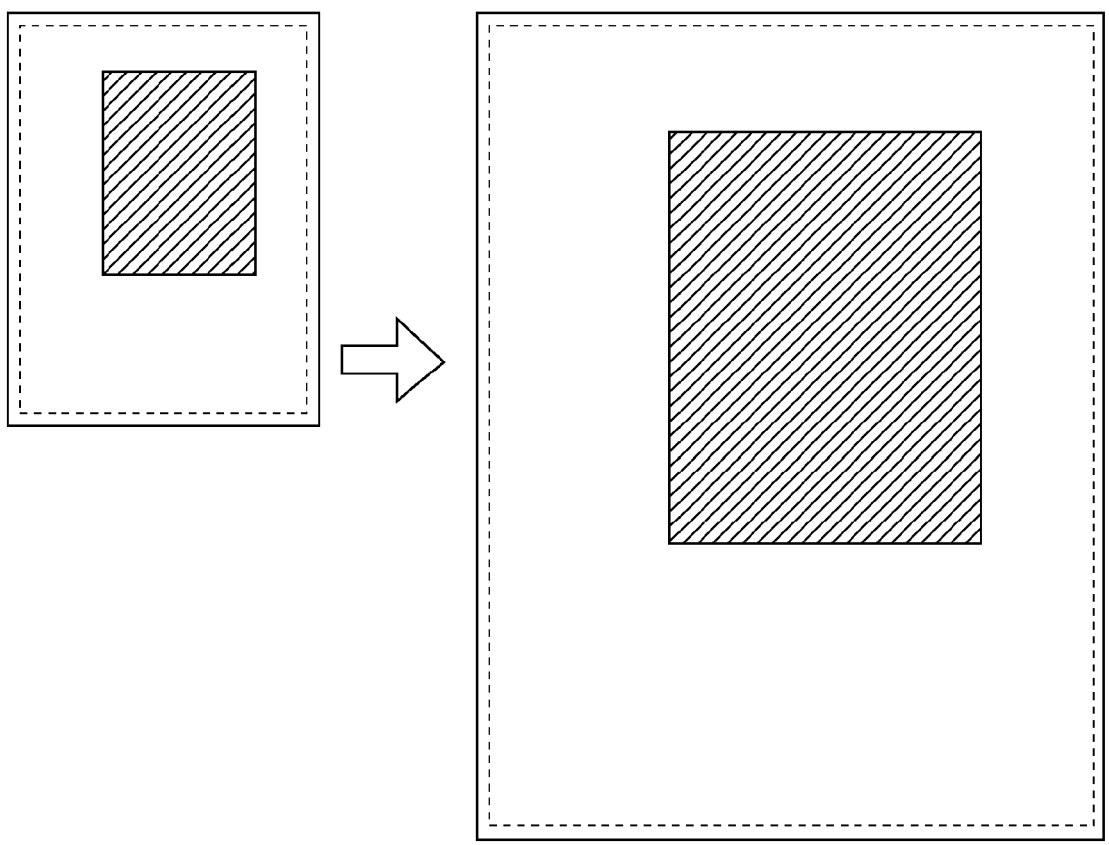
FIG. 11 shows a related art example in which a margin becomes large at the time of an expansion.

FIG. 10 is a flow chart for a plug-in program representing a series of operations in the plug-in according to the embodiment of the present invention. First, on the tool bar 303 of the spreadsheet software 103, when a user presses a plug-in activation icon 308, an operation of the plug-in program is started, and the flow is shifted to step S1301. In step S1301, the display of the above-described specification dialog 701 at the roll paper width is carried out, and the input stand-by state from the user occurs. The user specifies the roll paper width on the specification dialog 701 at the roll paper width.

Herein, a 60-inch roll (152.4 cm) is specified. The OK button is pressed, and the flow is shifted to step S1302. In step S1302, the print setting management unit 107 obtains the original sheet size information 104 of the spreadsheet software 103. Herein, as the original sheet size, the user definition sheet of 6 inches wide (15.24 cm), 55 cm long is obtained, and the flow is shifted to step S1303.

In step S1303, the print setting management unit 107 obtains the margin information 105 of the spreadsheet software 103. Herein, the margin of 2 cm at the top, bottom, left, and right is obtained, and the flow is shifted to step S1304.

In step S1304, from the original sheet size information 104 and the margin information 105 obtained in step S1102, the drawing area of the spreadsheet software 103 is calculated. The drawing area has 112.4 mm wide, 510 mm long where the margin of the spreadsheet software 103 is removed from the outline sheet size of 152.4 mm wide, 550 mm long.

Then, the flow is shifted to step S1305. In step S1305, the display of the above-described margin setting screen of FIG. 9 is carried out, and the input stand-by state from the user occurs. The user sets the plug-in margin at the top, bottom, left, and right as 10 cm, and the flow is shifted to step S1306.

In step S1306, the scaling factor is calculated from the obtained roll paper width and the original sheet size. With respect to the roll paper width of 60 inched (1524 mm), as the width of the original sheet size 6 inches (15.24 cm), ×10 is calculated as the scaling factor, and the flow is shifted to step S1307.

In step S1307, the margin to be changed is calculated from the scaling factor of the plug-in margin calculated in step S1306. As a part obtained by removing the plug-in margin 10 cm by the physical margin 5 mm becomes the expanded margin, and a value 9.5 mm is calculated by dividing this margin 95 mm (=100 mm−5 mm) by the scaling factor (95 mm/10), which is added with the physical margin to calculate 14.5 mm, and the flow is shifted to step S1308.

In step S1308, from the drawing area of the spreadsheet software calculated in step S1304 and the margin calculated in step S1307, the user definition sheet creation unit 108 creates the user definition sheet. The drawing area of the spreadsheet software of 112.4 mm wide, 510 mm long is added with the calculated margin 14.5 mm at the top, bottom, left, and right to result in 141.4 mm crosswise, 539 mm lengthwise. Then, the flow is shifted to step S1309.

In step S1309, the print setting management unit 107 changes the original sheet size information 104 of the calculation software 103 to the user definition sheet created in step S1308, and the flow is shifted to step S1310. In step S1310, the print setting management unit 107 changes the margin information 105 of the calculation software 103 to the margin information calculated in step S1307, and the flow is shifted to step S1311.

In step S1311, the print setting management unit 107 performs the setting of the output scaling factor with respect to the printer driver 109 on the basis of the standard expansion reduction setting with the radio button 604 to be fitted to the width of the roll paper, and the flow is shifted to step S1312.

In step S1312, the plug-in program instructs the spreadsheet software to perform the printing at the current setting and ends the flow. The plug-in instructs the printer driver to send a print command at a new setting value of the margin on which the margin set by the user in the spreadsheet software is reflected.

The printer driver performs the expansion processing and issues an output instruction to the printer.

In this manner, by setting the value of the margin exceeding the setting range of the margin which can be set by the application software on the plug-in and creating the user definition sheet, the user can obtain the print product having the margin desired by the user.

This becomes the extremely effective application function extension in the setting of the margin in a case where the expansion print is carried out at the output sheet size exceeding the sheet size which can be edited by the application, in particular, in a case where the large-sized printer is used.

The aspects of the embodiment of the present invention can also be achieved of course while a computer-readable storage medium on which a program code of software for realizing the functions of the above-described embodiments is stored is supplied to a system or an apparatus, and the program code stored on the storage medium is read out and executed by a computer (a CPU or an MPU) of the system or the apparatus.

In this case, the program code itself read out from the storage medium realizes the functions of the above-described embodiments, and the storage medium realizes the functions of the above-described embodiments, and the storage medium on which the program code is stored constitutes the embodiment of the present invention.

As the storage medium for supplying the program code, for example, a flexible disk, a hard disk drive, an optical disk, an opto-magnetic disk, a CD-ROM, a CD-R, a magnetic tape, a non-volatile memory card, a ROM, a DVD, or the like can be used.

In addition, the functions of the above-described embodiments are realized not only when the program code read out by the computer is executed, but also when an operating system (OS) or the like running on the computer performs a part or all of the actual processes on the basis of an instruction of the program code. The present invention also of course includes a case in which the functions of the above-described embodiments are realized through the processing.

Furthermore, the program code read out from the storage medium is supposed to be written in a memory that is provided to a function expansion board inserted in the computer or a function expansion unit connected to the computer. After that, on the basis of the instruction of the program code, a CPU or the like provided to the function expansion board or the function expansion unit performs a part or all of the actual processes. The present invention also of course includes a case in which the functions of the above-described embodiments are realized through the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-076770 filed Mar. 26, 2009, which is hereby incorporated by reference herein in its entirety.

What is claimed is:

1. A method for an application, the method comprising:
   specifying an output sheet size output by a printing apparatus;
   obtaining a sheet size and margin information set on the application;
   calculating a scaling factor for changing the sheet size from the obtained sheet size to the specified output sheet size, on the basis of the obtained sheet size and the specified output sheet size;
   calculating margin information to be newly set on the application on the basis of the calculated scaling factor and the obtained margin information; and
   updating the obtained margin information of the application to updated margin information calculated in the calculating margin information step.

2. The method according to claim 1, further comprising determining whether a header or a footer is set on the application,
   wherein the updating does not update in a case where the determining determines that the header or the footer is set.

3. The method for the application according to claim 1, further comprising setting so as to be able to set margin information on a size exceeding a margin size which can be specified in the application,
   wherein the calculating margin information calculates margin information on the basis of the set margin information.

4. An apparatus which operates for an application, the apparatus comprising:
   a specification unit which specifies an output sheet size output by a printing apparatus;
   an obtaining unit which obtains a sheet size and margin information set on the application;
   a scaling factor calculation unit which calculates a scaling factor for changing the sheet size from the sheet size obtained by the obtaining unit to the output sheet size specified by the specification unit, on the basis of the obtained sheet size and the specified output sheet size;
   a margin information calculation unit which calculates margin information to be newly set on the application on the basis of the scaling factor calculated by scaling factor calculation unit and the margin information obtained by the obtaining unit; and
   an update unit which updates the margin information of the application to updated margin information calculated by the margin information calculation unit.

5. A non-transitory computer-readable storage medium containing computer-executable instructions an apparatus which operates for an application, the medium comprising:
   computer-executable instructions for specifying an output sheet size output by a printing apparatus;
   computer-executable instructions for obtaining a sheet size and margin information set on the application;
   computer-executable instructions for calculating a scaling factor for changing the sheet size from the obtained sheet size to the specified output sheet size, on the basis of the obtained sheet size and the specified output sheet size;
   computer-executable instructions for calculating margin information to be newly set on the application on the basis of the calculated scaling factor and the obtained margin information; and
   computer-executable instructions for updating the margin information of the application to updated margin information calculated by the computer-executable instructions for calculating the margin information.

* * * * *